Dec. 7, 1926.                                                      1,609,968
A. SCHROEDER
SPUT FOR METAL CONTAINERS
Filed Oct. 22, 1923
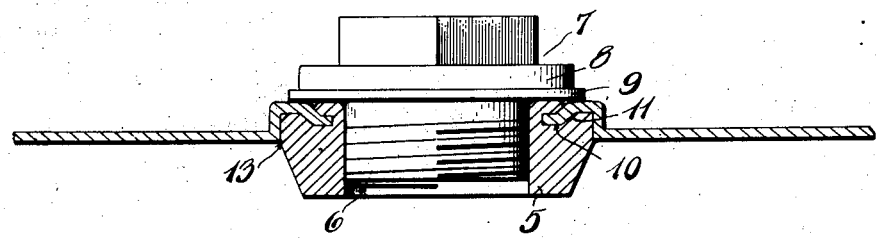
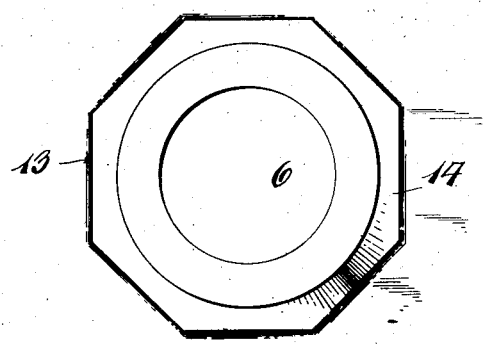
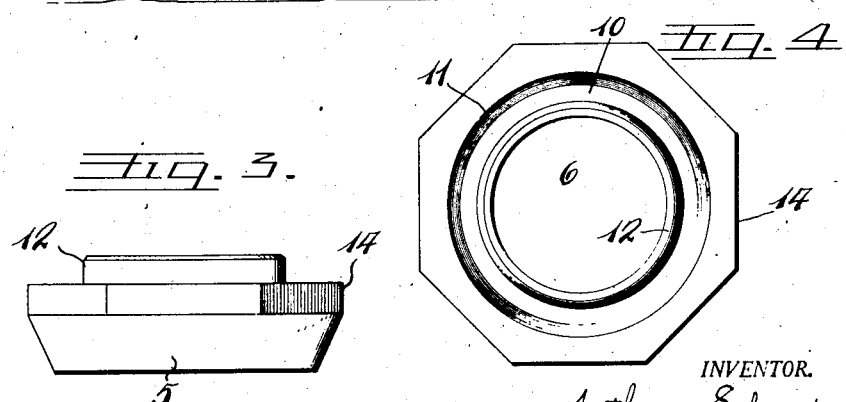
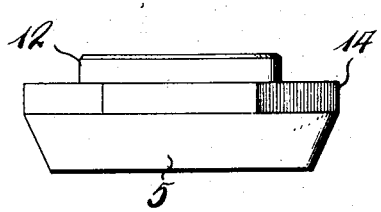
INVENTOR.
Anthony Schroeder
BY John A. Bommhardt
ATTORNEY.

Patented Dec. 7, 1926.

1,609,968

UNITED STATES PATENT OFFICE.

ANTHONY SCHROEDER, OF CLEVELAND, OHIO.

SPUT FOR METAL CONTAINERS.

Application filed October 22, 1923. Serial No. 670,058.

This invention relates to improvements in sputs for metal containers, having for an object to provide a reliable means for attaching a sput to a container in such a manner as to prevent leakage at the joint.

A further object is to provide a sput so attached that it cannot be moved axially and cause leakage around the joint.

A still further object is to provide a sput and receptacle connection in such a manner that reversal of the parts is possible so that the swaged portion may be arranged within the container or upon its outer face as desired.

It is likewise an object to provide a sput attached to a receptacle in such a manner that a packing gasket arranged beneath the plug will overlap the joint and rest partially upon the receptacle body portion thereby positively preventing leakage.

Other objects will be in part obvious and in part pointed out hereinafter.

In order that the invention and its mode of operation may be readily understood by persons skilled in the art, I have in the accompanying illustrative drawings and in the detailed description based thereon, set out one possible embodiment of the same.

In these drawings:

Fig. 1 is a central vertical section showing the connection between the sput and a receptacle, the packing gasket and plug being shown positioned thereon.

Fig. 2 is a bottom plan view showing the angular formation of the sput body and the similarly formed depression in the receptacle, and, Fig. 3 is a side elevation of the sput; and Fig. 4 is an end view thereof.

Having more particular reference to the drawings throughout which similar characters of reference designate similar parts, this improved sput may be stated as comprising a body portion 5 having formed therethrough a substantially centrally positioned screw threaded opening 6 in which is adapted to be threaded a plug 7 which is of the usual construction and includes an enlarged annular rib or shoulder 8 beneath which is placed a packing gasket 9 which preferably is of a slightly greater diameter than the aforementioned shoulder 8.

This sput 5, as shown in the drawings is provided upon one end portion with an annular groove or channel 10, having one wall 11 inclined outwardly as shown in Fig. 1, the other or inner wall of the channel being formed by an upstanding or longitudinally extended annular rib 12, which as shown is adapted to be turned over or swaged upon the flange formed around the opening in the receptacle.

In providing the receptacle with the opening, the metal is stamped outwardly or inwardly as desired and forms a depression 13 which is provided centrally with an opening in which the sput is adapted to be arranged. The metal forming the bottom wall of this depression is stamped inwardly near the edge of the opening and then again turned and extended in a plane with the main body portion of the receptacle, this arrangement and formation of parts permitting of an assembly as shown in Fig. 1, in which the gasket 9 entirely covers the joint and positively prevents leakage around said joint.

In the usual assembly of sputs and receptacles or containers of this type there is a tendency upon insertion or removal of the plug, for the sput to turn with the plug independently of the receptacle, resulting in a loose and of course leaky joint, and in the impossibility of removing the plug with facility.

In order to overcome this fault, I have in the formation of the depressions in receptacles deviated from the usual construction, in that I make the depression angular in formation and provide the sput body with a similarly angled annular rib or shoulder 14 as is shown. It is very apparent that this construction will positively eliminate the relative turning which has heretofore been quite common and with proper swaging at the joint will entirely eliminate leakage and prevent the least bit of movement of the sput.

It is quite obvious that should it be desired to arrange the swaged portion within the receptacle, that the reversal thereof is easily possible. Due to the formation of the broad or wide bearing surface upon both ends of the sput 5, I may insert the plug 7 from either end, the gasket 9 being adapted for use with the plug in either event.

Manifestly, the construction shown is capable of considerable modification and such modification as may fall within the scope of my claim, I consider within the spirit of my invention.

I claim:

A receptacle wall having an outwardly offset portion forming a depression, the outer wall of the depression being non-circular, the bottom wall of the depression being provided with a central opening and having a portion adjacent the opening bent inwardly, a non-circular sput snugly fitting the depression, and having an annular rib extending thru the opening and swaged upon the inwardly bent portion, the outer non-circular edge of the sput being in contact with the outer wall of the depression in the plane of the receptacle wall around the offset portion, whereby the sput cannot turn without distorting the receptacle wall.

In testimony whereof, I affix my signature.

ANTHONY SCHROEDER.